(No Model.) 12 Sheets—Sheet 1.

M. GLEDHILL.
BREECH MECHANISM FOR ORDNANCE.

No. 565,163. Patented Aug. 4, 1896.

(No Model.) 12 Sheets—Sheet 3.
M. GLEDHILL.
BREECH MECHANISM FOR ORDNANCE.

No. 565,163. Patented Aug. 4, 1896.

Fig. 3.

Witnesses.
Thos. A. Inus
Robert Everett.

Inventor.
Manassah Gledhill.
By James L. Norris.
Atty.

THE NORRIS PETERS CO., PHOTO-LITHO., WASHINGTON, D. C.

(No Model.) 12 Sheets—Sheet 4.
M. GLEDHILL.
BREECH MECHANISM FOR ORDNANCE.

No. 565,163. Patented Aug. 4, 1896.

Fig. 4.

Witnesses.
Thos. A. Gunn
Robert Everett

Inventor:
Manassah Gledhill.
By James L. Norris.
Atty.

(No Model.) 12 Sheets—Sheet 5.
M. GLEDHILL.
BREECH MECHANISM FOR ORDNANCE.
No. 565,163. Patented Aug. 4, 1896.

Witnesses.
Inventor.
Manassah Gledhill.
By James L. Norris.
Atty.

(No Model.)  
12 Sheets—Sheet 6.

M. GLEDHILL.
BREECH MECHANISM FOR ORDNANCE.

No. 565,163.  
Patented Aug. 4, 1896.

Fig. 6.

Witnesses:  
J. A. Rutherford  
Robert Everett

Inventor:  
Manassah Gledhill  
By James L. Norris  
Attorney (No Model.) 12 Sheets—Sheet 7.

M. GLEDHILL.
BREECH MECHANISM FOR ORDNANCE.

No. 565,163. Patented Aug. 4, 1896.

(No Model.)  12 Sheets—Sheet 8.

M. GLEDHILL.
BREECH MECHANISM FOR ORDNANCE.

No. 565,163. Patented Aug. 4, 1896.

(No Model.) 12 Sheets—Sheet 9.
M. GLEDHILL.
BREECH MECHANISM FOR ORDNANCE.

No. 565,163. Patented Aug. 4, 1896.

(No Model.) 12 Sheets—Sheet 10.
M. GLEDHILL.
BREECH MECHANISM FOR ORDNANCE.

No. 565,163. Patented Aug. 4, 1896.

Witnesses.
Inventor
Manassah Gledhill.
By James L. Norris.
Atty.

(No Model.) 12 Sheets—Sheet 11.
M. GLEDHILL.
BREECH MECHANISM FOR ORDNANCE.

No. 565,163. Patented Aug. 4, 1896.

Witnesses.

Inventor.
Manassah Gledhill.
By James L. Norris.

(No Model.)  12 Sheets—Sheet 12.

M. GLEDHILL.
BREECH MECHANISM FOR ORDNANCE.

No. 565,163. Patented Aug. 4, 1896.

Witnesses.

Inventor.
Manassah Gledhill.
By James L. Norris.
Atty.

THE NORRIS PETERS CO., PHOTO-LITHO., WASHINGTON, D. C.

UNITED STATES PATENT OFFICE.

MANASSAH GLEDHILL, OF MANCHESTER, ENGLAND, ASSIGNOR TO THE SIR JOSEPH WHITWORTH & COMPANY, LIMITED, OF SAME PLACE.

BREECH MECHANISM FOR ORDNANCE.

SPECIFICATION forming part of Letters Patent No. 565,163, dated August 4, 1896.

Application filed September 22, 1892. Serial No. 446,622. (No model.)

*To all whom it may concern:*

Be it known that I, MANASSAH GLEDHILL, director of the Sir Joseph Whitworth & Company, Limited, engineers, of Openshaw, Manchester, England, a subject of the Queen of Great Britain, and a resident of Openshaw, Manchester, England, have invented certain new and useful Improvements in Breech Mechanism for Quick-Firing and other Guns, of which the following is a specification, reference being had to the accompanying drawings.

My invention relates to breech mechanism of that class wherein the breech is closed by a screw breech-block with interrupted or segmental screw-threads supported with a capability of turning on its axis in a carrier or bracket hinged to one side of the breech end of the gun. In breech mechanism of this class the opening of the breech involves, first, the partial rotation of the breech-block about its axis; secondly, the withdrawal of the said block from the gun, and, thirdly, the movement of the said block away from the breech by turning the bracket about the hinge or pivot. The closing of the breech involves the reverse of these operations.

The object of my said invention is to provide simple and efficient means whereby the opening or the closing of the breech can be effected by the continuous movement of a lever or handle in one direction.

My invention also comprises the provision of novel firing mechanism hereinafter described, in combination with a breech-block which has an obturator and an axial vent.

In the accompanying drawings, which illustrate my invention.

Like letters indicate corresponding parts in all of the figures.

A is the breech end of the gun-barrel.

B is the breech-block.

C is a ring which I term the "breech-ring" or "actuating-ring," and which is supported with a capability of turning in a ring D, which is secured to the end of the gun and forms a base-piece, to which the carrier-bracket D' is hinged.

Figure 25:
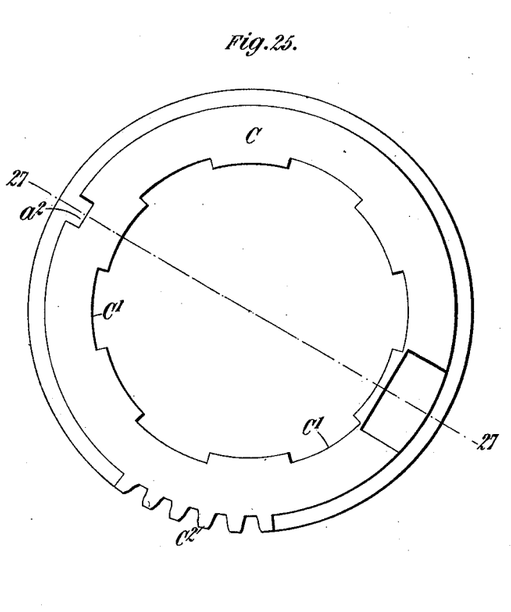
Fig. 25 is a rear view of the actuating-ring.
Figure 26:
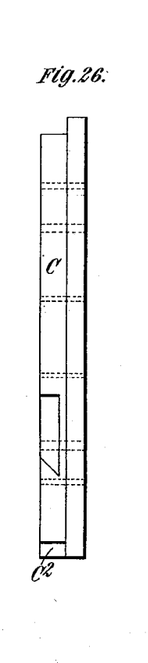
Fig. 26 is a side view of the same.
Figure 27:
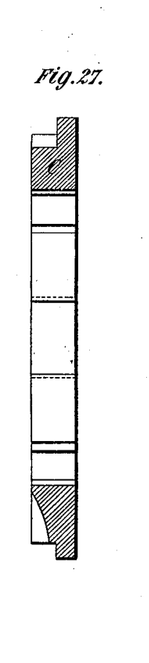
Fig. 27 is a section on the line 27 27 of Fig. 25.
Figure 28:
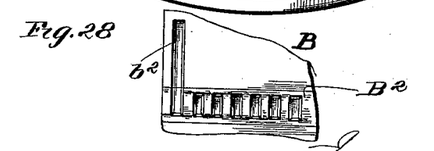
Fig. 28 is a detail side elevation of a part of the breech-block, showing the rack and the extended tooth, hereinafter explained.

The ring C has formed across its inner surface grooves or notches C', (see Fig. 25,) which engage with corresponding projections B' on the breech-block, so that the said ring and block when turning about their axis must turn together; but the block can move endwise through the ring. On the periphery of the said breech-ring I form a few teeth $C^2$, which are received in a recess in the ring D, and with which engage the teeth of a rack E. The said rack is mounted loosely on a plain cylindrical part of a shaft $E'$, which extends transversely across the end of the gun and is supported in bearings $E^2$, fixed or formed on the base-ring D. The said rack is prevented from sliding endwise on the shaft E by means of collars $E^3$, one of which is removable to allow of the rack being placed in proper position on the shaft and removed therefrom. On another part of the said shaft there is formed or secured a worm $E^4$, which gears with a worm-wheel F, secured upon a vertical shaft $F'$, which serves as the hinge-bolt upon which the aforesaid carrier-bracket $D'$ is supported and turns. This vertical shaft turns in bearings $F^2$ $F^2$, formed on the base-ring D.

The carrier-bracket $D'$ is preferably supported by a ball-bearing $D^2$, which permits a very free movement to the carrier in the opening and closing of the breech. The said vertical shaft or hinge-bolt $F'$ has fixed on it a toothed pinion $F^3$, which gears with a longitudinal rack $B^2$, fixed to the side of the breech-block. The rear end tooth $b^2$ of this rack is of such length, or, in other words, extends circumferentially round the block for such a distance, that it does not become disengaged from the pinion $F^3$ when the block is turned.

Figure 6:
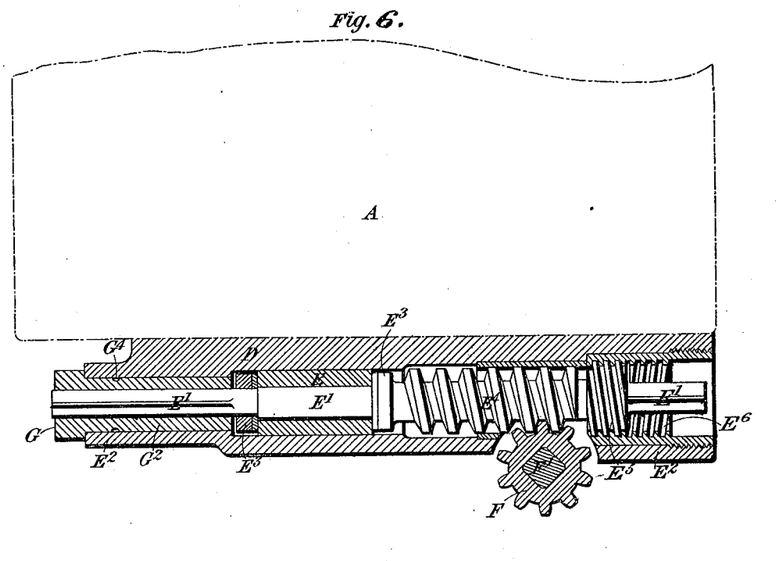
Fig. 6 is a horizontal section taken through the bearings of the shaft that operates the breech-block.
Figure 7:
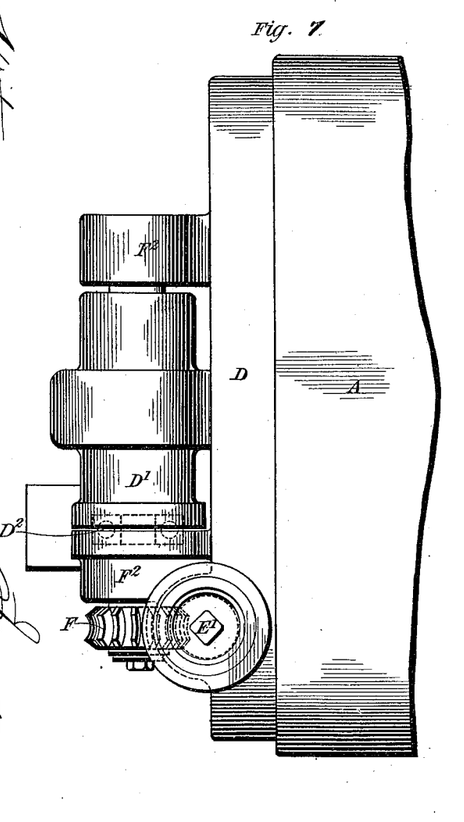
Fig. 7 is a side elevation of the breech.

Near the right end of the shaft $E'$, I provide a double-threaded screw $E^5$, Fig. 6, the teeth of which have the same pitch as that of the worm $E^4$. This screw engages with a nut $E^6$, fixed in the bearing $E^2$, and screws to and fro through the said nut when the shaft $E'$ is rotated.

G is a handle mounted on the squared left end of the shaft $E'$. A similar handle may be mounted on the squared right end of the shaft for the purpose of enabling additional turning effort to be applied to overcome sticking of the breech-block, which may occasionally occur.

The handle G is formed with a long hub $G^2$, which enters the bearing $E^2$, for a purpose hereinafter described.

$G^3$ is a pin which passes through the bearing $E^2$ and through a circumferential groove $G^4$, formed in the hub $G^2$, for the purpose of retaining the handle G in position. By turning the handle continuously in one or other direction the series of operations necessary for opening or closing the breech can be easily and quickly performed.

The action of the apparatus is as follows: When the handle G is turned in the proper direction, assuming the breech to be properly closed, the shaft $E'$ by reason of the engagement of the screw $E^5$ with the nut $E^6$ is caused to travel axially, carrying with it the rack E, and thereby through the medium of the teeth $C^2$ on the breech-ring C turning the breech-block about its axis in the proper direction to disengage its screw-threads from those of the gun. The longitudinal thrust on the shaft $E'$ during the unlocking of the breech-block is taken up by the screw $E^5$, which prevents any undue pressure between the worm $E^4$ and the worm-wheel F, and avoids setting up friction between the pinion $F^3$ and the tooth $b^2$ while the breech-block is being unlocked. The said screw $E^5$ is so arranged that it screws completely out of or clears its nut $E^6$ just as the breech-block becomes unlocked. The rotary movement of the breech-block in both directions is limited by the length of the recess in the base-ring D in which a sector constituted by the teeth $C^2$ works. When the breech-block is unlocked, the rotary movement thereof, and also the sliding movement of the shaft $E'$ are arrested, so that the continued rotation of the said worm-shaft will now cause the vertical shaft $F'$ to turn and thereby through the medium of the pinion $F^3$ and longitudinal rack $B^2$ withdraw the breech-block from the gun. The block moves outward until it is arrested by stops $D^4$ on the tray $D^3$ of the carrier, whereupon the continued turning of the handle in the same direction causes the carrier with the block to swing on its hinge or pivot away from the breech.

Figure 2:
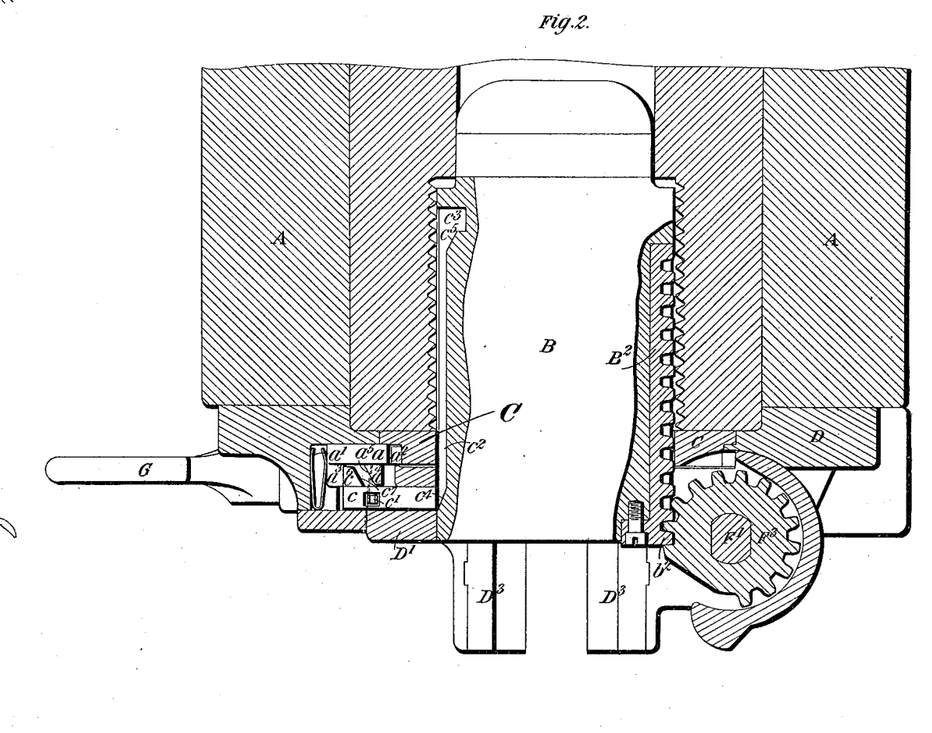
Fig. 2 is a horizontal central section of the same, the breech-block being unlocked and ready for withdrawal.
Figure 3:
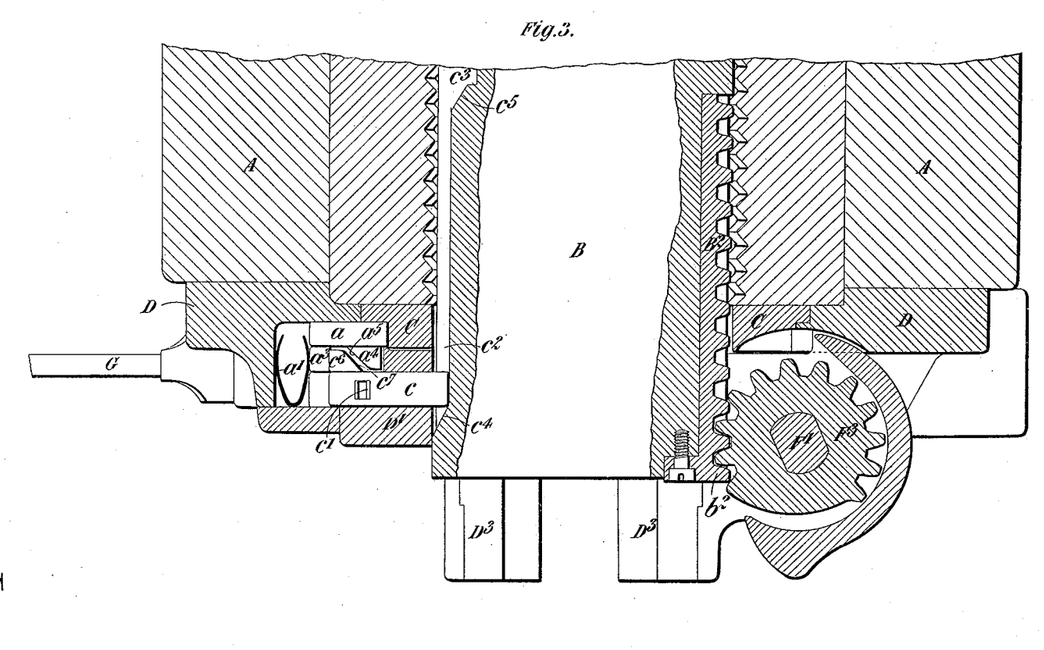
Fig. 3 is a similar section, but drawn to a larger scale, showing the block partially withdrawn.
Figure 4:
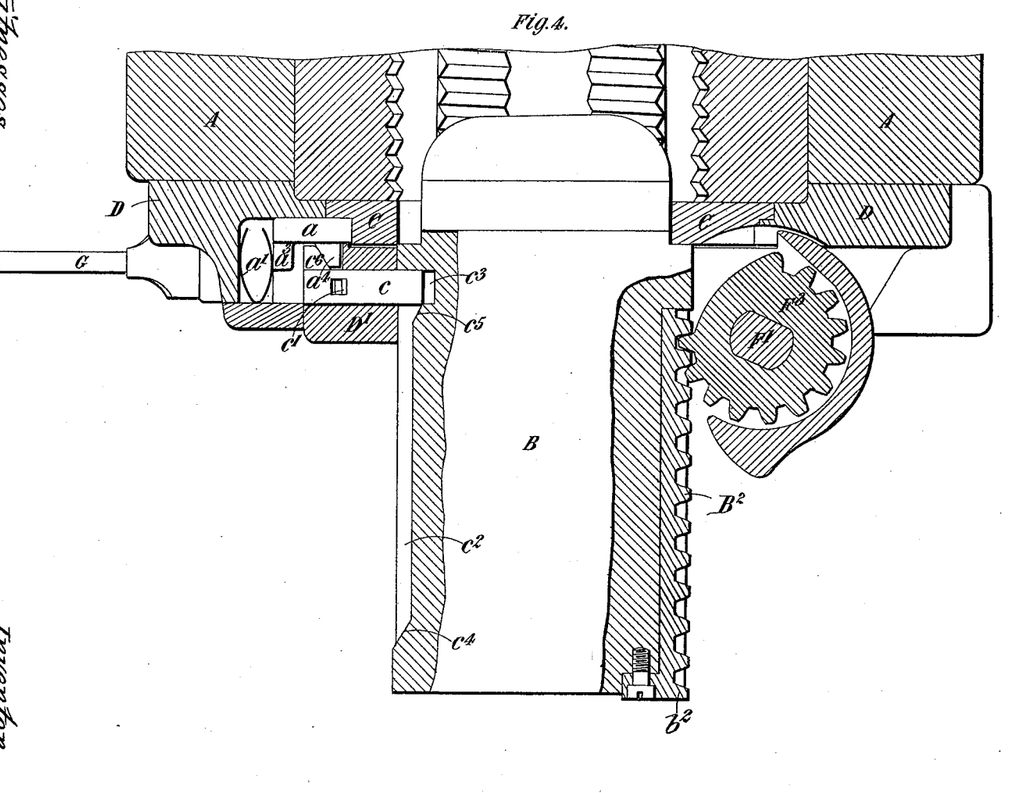
Fig. 4 is a similar section showing the block still farther withdrawn and ready to be swung with the carrier-bracket about the hinge-pin of the latter.
Figure 5:
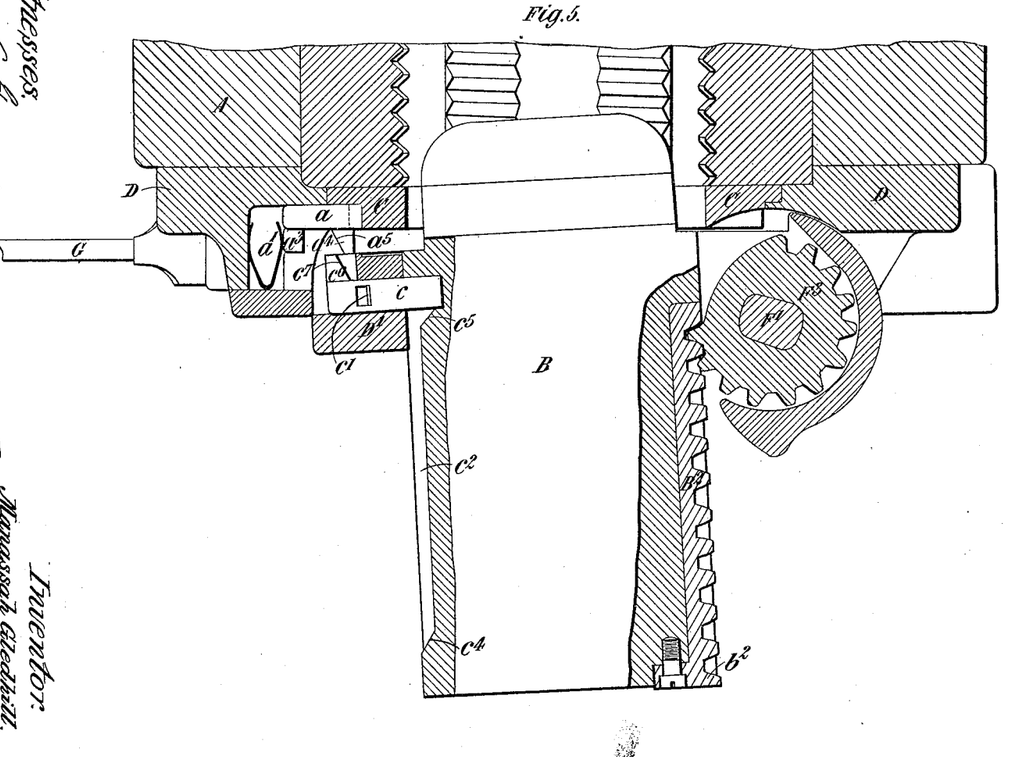
Fig. 5 is a similar section showing the carrier-bracket turned a little way about its hinge-pin.

I provide locking-catches as follows, that is to say, $a$ is a catch for locking the actuating or breech ring C when the breech-block is withdrawn. $a'$ is its controlling-spring. $a^2$, Fig. 2, is the notch in the ring C with which it engages. $c$ is a catch for locking the breech-block to the carrier-ring $D'$. $c'$ is its controlling-spring. $c^2$ is a longitudinal groove in the side of the breech-block, with which groove the catch $c$ is adapted to engage. $c^3$ is a deep recess at the rear end of said groove. $c^4$ $c^5$ are inclined faces formed in said groove for a purpose hereinafter described. $a^3$ $a^4$ are projections formed on the catch $a$ and adapted to engage, as hereinafter described, with a projection $c^6$ on the catch $c$. The working face $a^5$, Fig. 3, of the projection $a^4$ is inclined, as shown. The corresponding face $c^7$ of the projection $c^6$ is also inclined.

The action of the said catches is as follows: When the breech-block is unlocked ready for withdrawal, the notch or groove $a^2$ in the ring C is opposite the catch $a$, but the said catch is prevented from entering the said notch by the catch $c$, which bears against the breech-block and has its projection $c^6$ sustaining the projection $a^3$ of the catch $a$. When, however, the breech-block is partially withdrawn, the groove $c^2$ passes in line with the catch $c$, and the latter is pressed therein by its spring $c'$, and the catch $a$ being thus freed at the same time enters the notch $a^2$ and locks the actuating-ring C. When the breech-block is fully withdrawn, the catch $c$ enters the recess $c^3$ as far as it is permitted to do so by the projection $a^4$ of the catch $a$, and still further enters and locks the plug to the carrier-ring when the breech-ring is turned on its hinge, so that the projection $c^6$ of the catch $c$ is clear of the projection $a^4$ of the catch $a$. During the operation of reclosing the breech, the inclined faces $c^7 a^5$ of the projections $c^6 a^4$ first engage each other and the catch $c$ is thereby partially withdrawn from the recess $c^3$, thus allowing the breech-block to be pushed into the breech. The inclined face $c^5$ of the groove $c^2$ completes the raising of catch $c$ out of the recess $c^3$, and brings the projection $c^6$ against the projection $a^3$. Just as the breech-block is nearing home the incline $c^4$ operates to raise the catch $c$ completely out of the groove $c^2$ and unlocks the breech-block, and at the same time operates through the projections $c^6 a^3$ to withdraw the catch $a$ from the notch $a^2$ and release the actuating-ring, thus allowing the breech-block to be screwed home.

Figure 8:
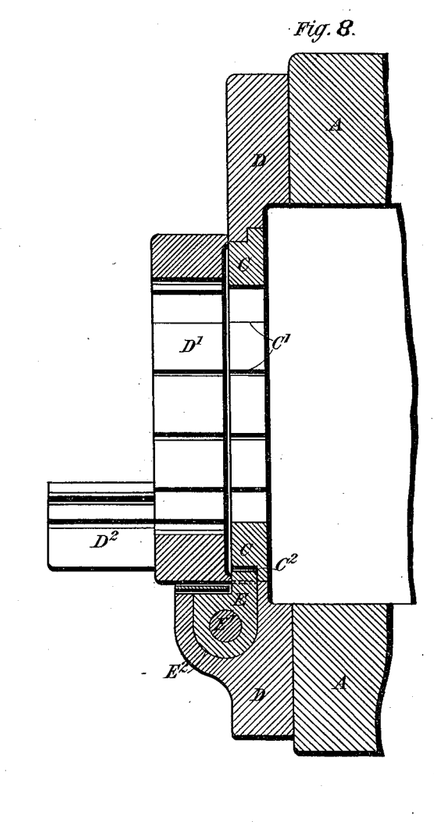
Fig. 8 is a vertical central longitudinal section through the breech and carrier-bracket, the breech-block being removed.
Figure 9:
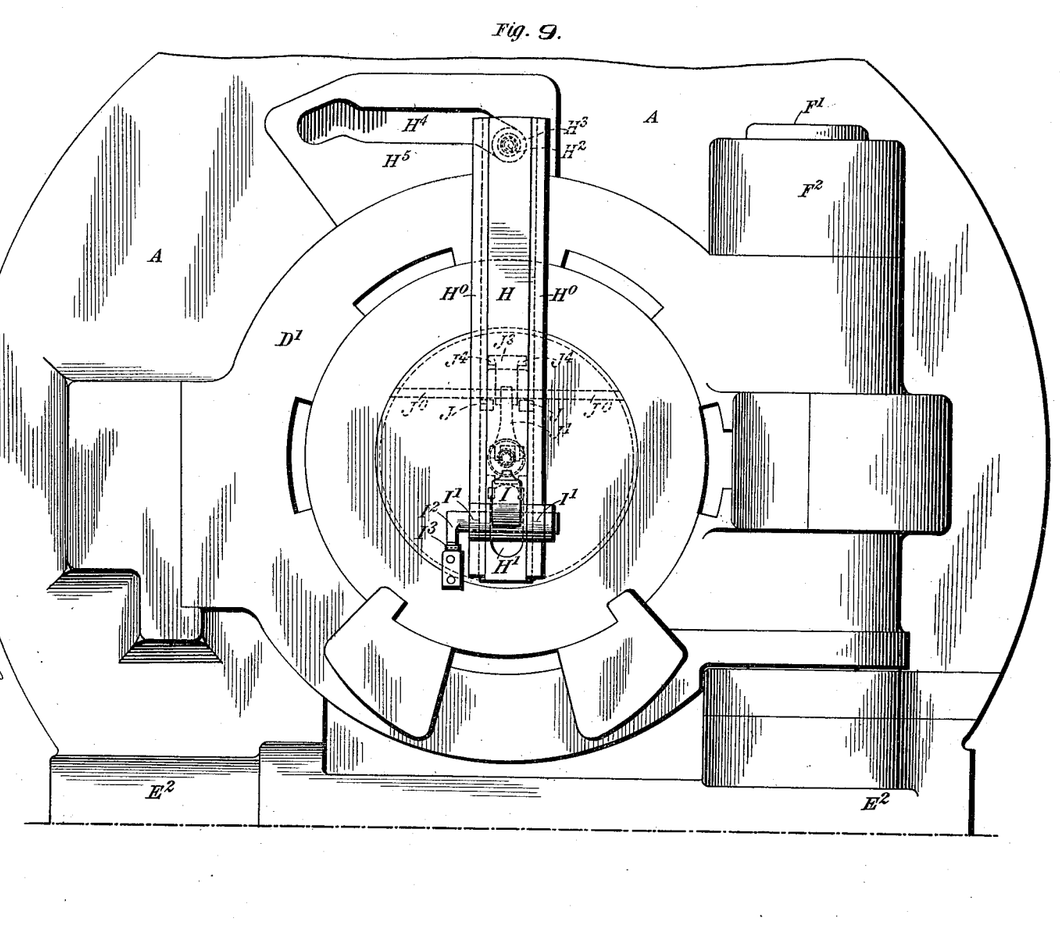
Fig. 9 is a rear end elevation of the breech, drawn to a larger scale, and showing the firing mechanism.
Figures 10, 11, 12:
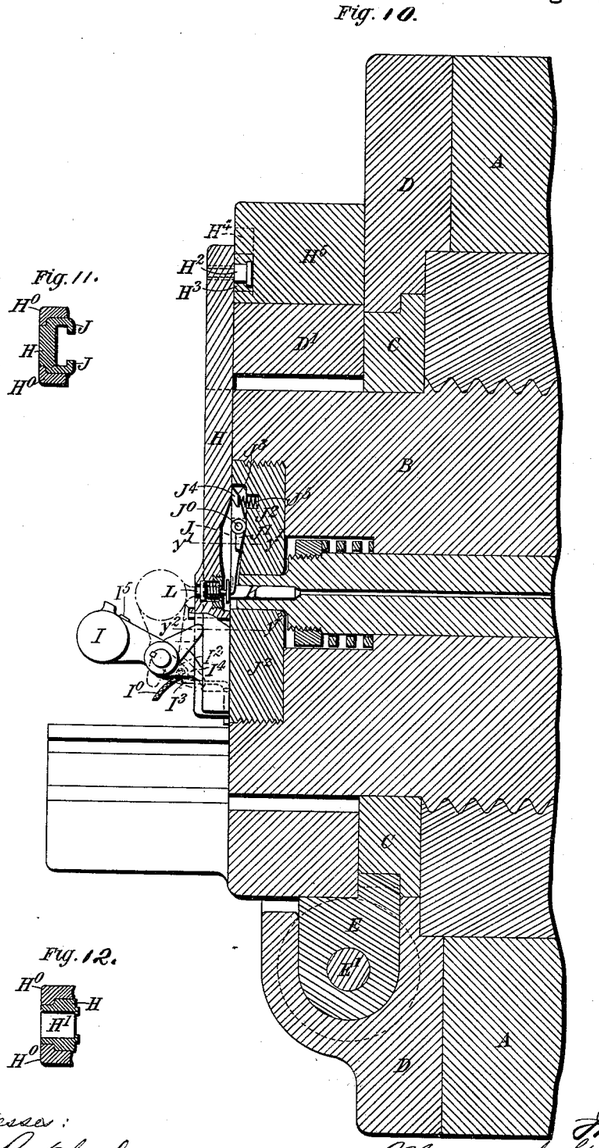
Fig. 10 is a vertical longitudinal central section of the same.
Figs. 11 and 12 are transverse sections of the slide hereinafter described, taken on the lines $y'\ y'\ y^2\ y^2$, respectively, of Fig. 10.
Figures 13, 15, 16, 17, 18, 19:
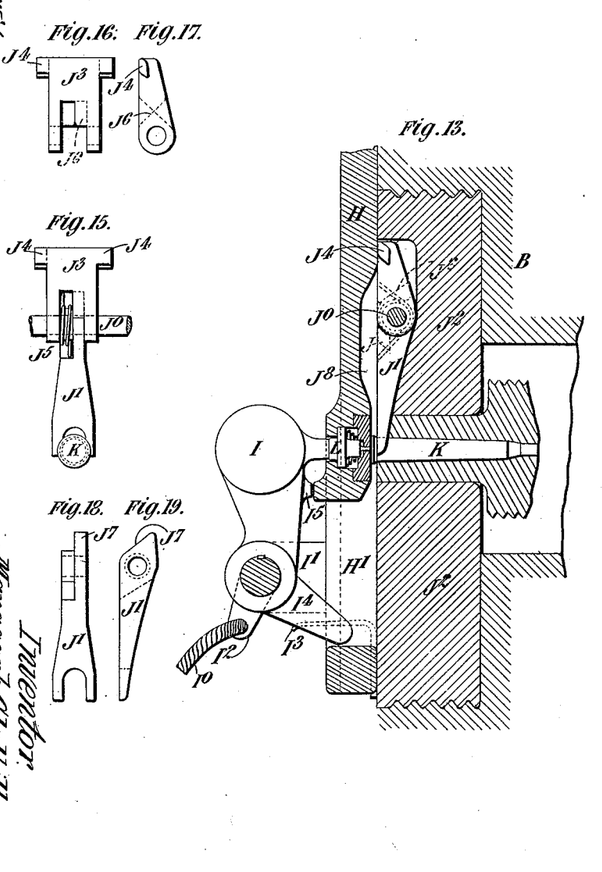
Fig. 13 is a central longitudinal vertical section, drawn to a larger scale, of a portion of the rear end of the breech-block, showing the firing mechanism.
Fig. 15 is a rear view of the ejecting-levers of the primer.
Figs. 16 and 17 are rear and side views, respectively, of one of these levers detached.
Figs. 18 and 19 are similar views of the other lever.
Figure 14:
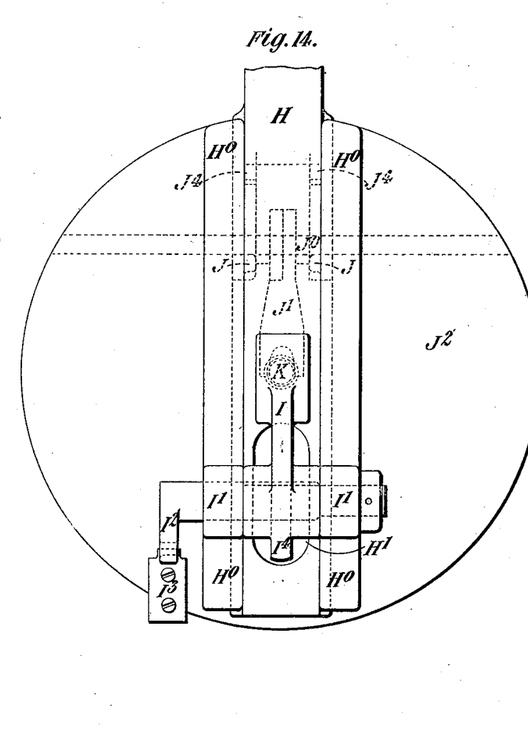
Fig. 14 is a rear end elevation of the said parts.
Figure 20:
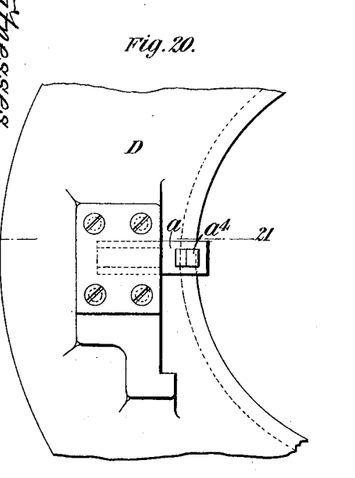
Fig. 20 is a rear view of a portion of a ring secured to the end of the gun and of the catch carried by said ring for locking the actuating-ring hereinafter described.
Figure 21:
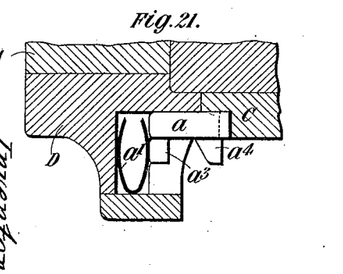
Fig. 21 is a section taken on the line 21 21 of Fig. 20.
Figure 22:
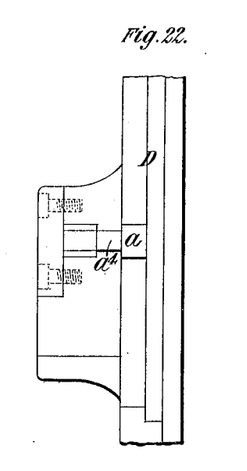
Fig. 22 is a side elevation of the parts shown in Fig. 20.
Figure 23:
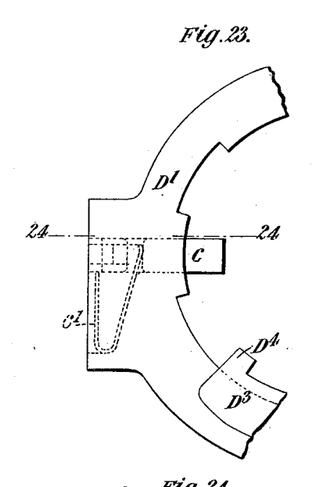
Fig. 23 is a rear elevation of a portion of the carrier ring or bracket, showing the catch for locking the breech-screw to said bracket.
Figure 24:
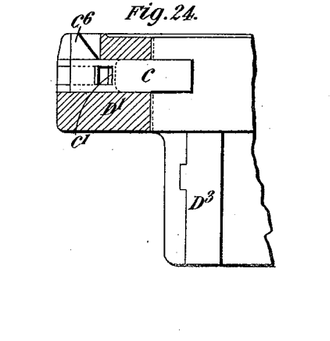
Fig. 24 is a section of the same on the line 24 24, Fig. 23.

During the axial movement of the shaft $E'$ the squared end of the shaft slides through the hub $G^2$ of the handle G, which hub is made very long to permit of such sliding movement without disengagement. The toothed portion of the rack E passes behind the carrier-bracket $D'$, as shown in Fig. 8, and is maintained in gear with the teeth $C^2$.

During the closing of the breech the reëntry of the screw $E^5$ into its nut $E^6$ is insured by reason of the fact that the worm $E^4$, which is of the same pitch as the screw $E^5$, remains always in gear with the worm-wheel F.

Figure 1:
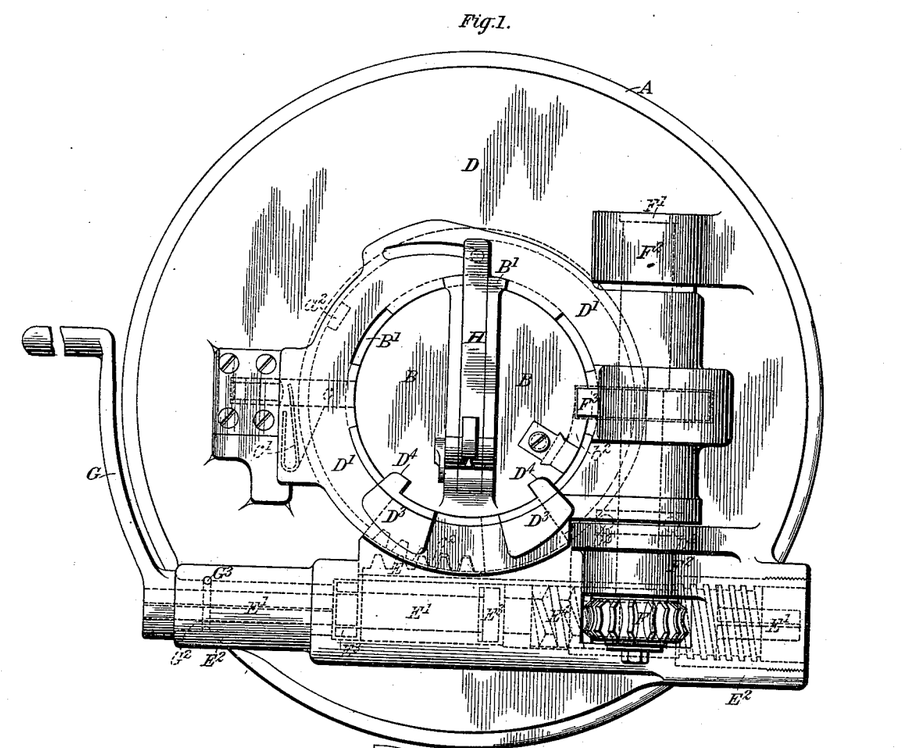
Figure 1 is a rear elevation, partly in section, of a gun-breech constructed according to my invention, the firing mechanism being removed.

For a gun having a breech-block, such as that shown in Figs. 1 and 2, which has an obturator and an axial vent, I arrange the firing mechanism as follows, that is to say, I provide the breech with a plate H, Figs. 9, 10, 13, and 14, which is adapted to slide between guides $H^0 H^0$, formed on the rear end of the breech-block, and which is automatically operated during the turning of the breech-block and performs the operations of extracting and ejecting the spent primer, and recocking the hammer or striker.

I is the hammer, which is pivoted in bearings $I' I'$ on the rear of the breech-block.

$I^2$ is a short arm fixed on the hammer-axis and adapted to engage a spring-catch $I^3$ when the hammer is cocked and retain the hammer in the cocked position. The lanyard $I^0$ for pulling the hammer to fire the gun is attached to the said arm $I^2$. The hammer or striker is formed with a tailpiece $I^4$, which projects into a slot $H'$, formed in the lower end of the sliding plate H. The upper end of the said sliding plate carries a stud $H^2$, provided with an antifriction-bowl $H^3$, which works in a stationary cam-slot $H^4$, formed in a piece $H^5$, fixed to the rear end of the gun. The said cam-slot is so arranged that in the turning of the breech-block about its axis to unlock the same the sliding plate H will be raised to automatically cock the hammer and to withdraw and eject the spent primer, as hereinafter described, and also to bring the slot $H'$ in the lower end of the plate opposite the axial vent to permit the primer to be ejected and a fresh one inserted. The hammer is cocked by the lower end of the slot $H'$, which when the plate H is raised bears upon the tail $I^4$ of the hammer and turns the hammer about its pivot.

The extracting devices consist of lugs J, formed on the sliding plate H and arranged to actuate an ejecting-lever $J'$, which is pivoted on a pin $J^0$, carried by a block $J^2$, screwed in the end of the breech-block. The lower end of the said ejecting-lever is forked and engages with the rim of the primer K. Another lever $J^3$, also pivoted on the pin $J^0$, is provided on each side with a projecting lug or ear $J^4$, having inclined upper and lower faces, as shown. The said lever $J^3$ is formed with an inclined face $J^6$, which bears against a similar inclined face $J^7$, formed on the lower lever J, these faces being so arranged that when the upper end of the lever $J^3$ is pushed forward the lower end of the lever $J'$ is caused to move backward, while on the other hand the lever $J^3$ can turn backward without moving the lever $J'$. A spring $J^5$ serves to keep the levers $J' J^3$ straight under normal conditions. The projections or lugs J on the plate H are so arranged that in the upward movement of the said sliding plate they strike the lugs or ears $J^4$ of the lever $J^3$, thereby suddenly turning the compound ejecting-lever $J^3 J'$ about its pivot and jerking the spent primer K from the vent. When the plate H is depressed again, the lugs J thereon pass on the other side of the lugs $J^4$, thereby turning the lever $J^3$ backward without affecting the lever $J'$. The inner face of the plate H is recessed at $J^8$, as shown, to allow of the turning movements of the levers $J' J^3$.

The sliding plate H carries a spring-controlled device or firing-pin L, which, in firing, is struck by the hammer and transmits the blow to the primer in the axial vent. This firing-pin is so arranged that its axis coincides with that of the vent when the breech-block is properly screwed home.

I arrange the slot $H'$ in the plate H in such manner that were the breech not properly closed the lower end of the said slot would stand in the way of the tail $I^4$ of the hammer and would arrest the movement of the hammer in case it were pulled with the breech in that position. It follows, therefore, that the primer cannot be struck by the hammer until the breech-block is securely closed and locked.

$I^5$ is a stop which strikes the plate H and arrests the hammer after the latter has struck the firing-pin.

What I claim is—

1. In a breech-loading gun, the combination with the breech-block, of a carrier-bracket, a worm capable of limited endwise or axial movement and gearing with a worm-wheel on the hinge-bolt of the carrier-bracket, a rack mounted loosely on the worm-shaft and geared with a ring through which the breech-block can slide but which cannot turn without turning the block, and gearing connecting the hinge-bolt with the breech-block so that when the worm-shaft is rotated it will operate through the rack to first unlock the breech, and will then by turning the hinge-bolt withdraw the block and afterward move it and the carrier-bracket away from the breech, substantially as described.

2. In a breech-loading gun, the combination with the breech-block, of a carrier-bracket, a worm capable of limited endwise or axial movement and gearing with a worm-wheel on the hinge-bolt of the carrier-bracket, a rack mounted loosely on the worm-shaft and geared with a ring through which the breech-block can slide but which cannot turn without turning the block, and a pinion fixed on the hinge-bolt and gearing with a rack fixed longitudinally in the breech-block, said rack having a long tooth at the rear end thereof to allow the block to turn without becoming disengaged from the pinion, all substantially as described and for the purpose specified.

3. In a breech-loading gun, the combination with the breech-block, of a carrier-bracket, a worm capable of limited endwise or axial movement and gearing with a worm-wheel on the hinge-bolt of the carrier-bracket, a rack mounted loosely on the worm-shaft and geared with a ring through which the breech-block can slide but which cannot turn without turning the block, and a pinion fixed on the hinge-bolt and gearing with a rack fixed longitudinally in the breech-block, said rack having a long tooth at the rear end thereof to allow the block to turn without becoming disengaged from the pinion, and a screw of the same pitch as the worm formed on the worm-shaft and engaging a fixed nut so as to take the thrust of the worm-shaft when unlocking the breech, substantially as described.

4. The combination with the breech-block B, of the rack $B^2$ fixed therein, the pinion $F^3$ fixed on the hinge-bolt and gearing with the said rack, the worm $E^4$ gearing with the worm-wheel F on the hinge-bolt, said worm being capable of sliding in its bearings for a limited distance, the rack E loosely mounted on the worm-shaft $E'$ between collars $E^3$ $E^3$, the toothed ring C mounted to turn in the fixed base-ring D and gearing with the rack E and having internal projections and depressions engaging with the segments of the breech-block so as not to turn without turning the block while allowing the block to slide through the ring, a handle for turning the worm-shaft $E'$, and the carrier-bracket $D'$ supported by the ball-bearing $D^2$, substantially as described.

5. In a breech-loading gun, the combination with the breech-block, of a plate adapted to slide between guides in the end of the block, a pin carried by said plate, and engaging a cam-groove formed in a piece fixed to the gun whereby the plate is moved across the breech when the block is turned, a hammer pivoted to the breech-block and having a tailpiece which projects into a slot in the sliding plate so as to be cocked thereby when the plate is actuated, and an arm on the hammer-pivot adapted to engage a stationary spring-piece which retains the hammer in the cocked position until jerked by the lanyard, substantially as described.

6. In a breech-loading gun, the combination with the breech-block, of a plate adapted to slide between guides in the end of the block, a pin carried by said plate and engaging a cam-groove formed in a piece fixed to the gun whereby the plate is moved across the breech when the block is turned, a compound extractor-lever $J'$, $J^3$, pivoted to the breech-block, lugs $J^4$ formed on the extractor-lever, said lugs having inclined faces, other lugs J on the plate H adapted to strike the said inclined faces of the lugs $J^4$ when the plate H is raised, thereby turning the extractor-lever about its pivot, and ejecting the primer, substantially as described.

7. In a breech-loading gun, the combination with the breech-block, of a plate adapted to slide between guides in the end of the block, a pin carried by said plate and engaging a cam-groove formed in a piece fixed to the gun whereby the plate is moved across the breech when the block is turned, an extractor-lever $J'$ pivoted on a pin $J^0$ and having an inclined face $J^7$, another lever $J^3$ pivoted on the same pin and having an inclined face $J^6$ engaging with the aforesaid face $J^7$, lugs $J^4$ formed on the lever $J^3$ said lugs having inclined faces, a spring $J^5$ engaging the levers $J'$, $J^3$ to keep them straight, projections J on the plate H adapted to strike the rear inclined faces of the lugs $J^4$ when the plate H is raised thereby turning the extractor-lever $J'$ about its pivot and ejecting the primer, and adapted to strike the forward inclined faces of the said lugs $J^4$ when the plate H is depressed thereby turning the lever $J^3$ and passing below the lugs $J^4$ without affecting the lever $J'$, and a recess $J^8$ in the plate H to allow of these movements of the levers $J^3$, $J'$, substantially as described.

8. In a breech-loading gun, the combination with the breech-block, of a sliding plate H, a spring-controlled firing-pin L in said plate and located behind the primer when the breech-block is properly locked, a hammer pivoted to the breech-block and having a tailpiece which projects into a slot in the sliding plate so as to be cocked thereby when the plate is actuated, and an arm on the hammer-pivot adapted to engage a stationary spring-piece which retains the hammer in the cocked position until jerked by the lanyard, substantially as described.

In witness whereof I have hereunto set my hand this 1st day of September, 1892.

MANASSAH GLEDHILL.

Witnesses:
H. HARRINGTON,
J. M. GLEDHILL.